(12) United States Patent
Watson

(10) Patent No.: US 10,639,986 B2
(45) Date of Patent: May 5, 2020

(54) FUEL CAP AND SEAL ASSEMBLY

(71) Applicant: Kenneth A. Watson, Vancouver, WA (US)

(72) Inventor: Kenneth A. Watson, Vancouver, WA (US)

(*) Notice: Subject to any disclaimer, the term of this patent is extended or adjusted under 35 U.S.C. 154(b) by 274 days.

(21) Appl. No.: 14/616,200

(22) Filed: Feb. 6, 2015

(65) Prior Publication Data

US 2016/0229288 A1  Aug. 11, 2016

(51) Int. Cl.
*B60K 15/04* (2006.01)

(52) U.S. Cl.
CPC .. *B60K 15/0406* (2013.01); *B60K 2015/0451* (2013.01)

(58) Field of Classification Search
CPC ........ B60K 15/0406; B60K 2015/0432; B60K 2015/0451
See application file for complete search history.

(56) References Cited

U.S. PATENT DOCUMENTS

| | | | | |
|---|---|---|---|---|
| 5,325,882 A | * | 7/1994 | Forsythe | B60K 15/03519 137/43 |
| 2003/0116524 A1 | * | 6/2003 | Robinson | B65D 1/023 215/349 |
| 2008/0110851 A1 | * | 5/2008 | Fuchs | B65D 41/0421 215/344 |

* cited by examiner

*Primary Examiner* — Steven A. Reynolds
*Assistant Examiner* — Javier A Pagan
(74) *Attorney, Agent, or Firm* — Ingrid McTaggart

(57) ABSTRACT

The present invention provides a fuel cap including a body, a seal positioned within the body and adapted for engaging a filler tube opening, the seal manufactured of a material and in a shape such that the seal itself provides the biasing force to secure the cap on the filler tube opening.

20 Claims, 3 Drawing Sheets

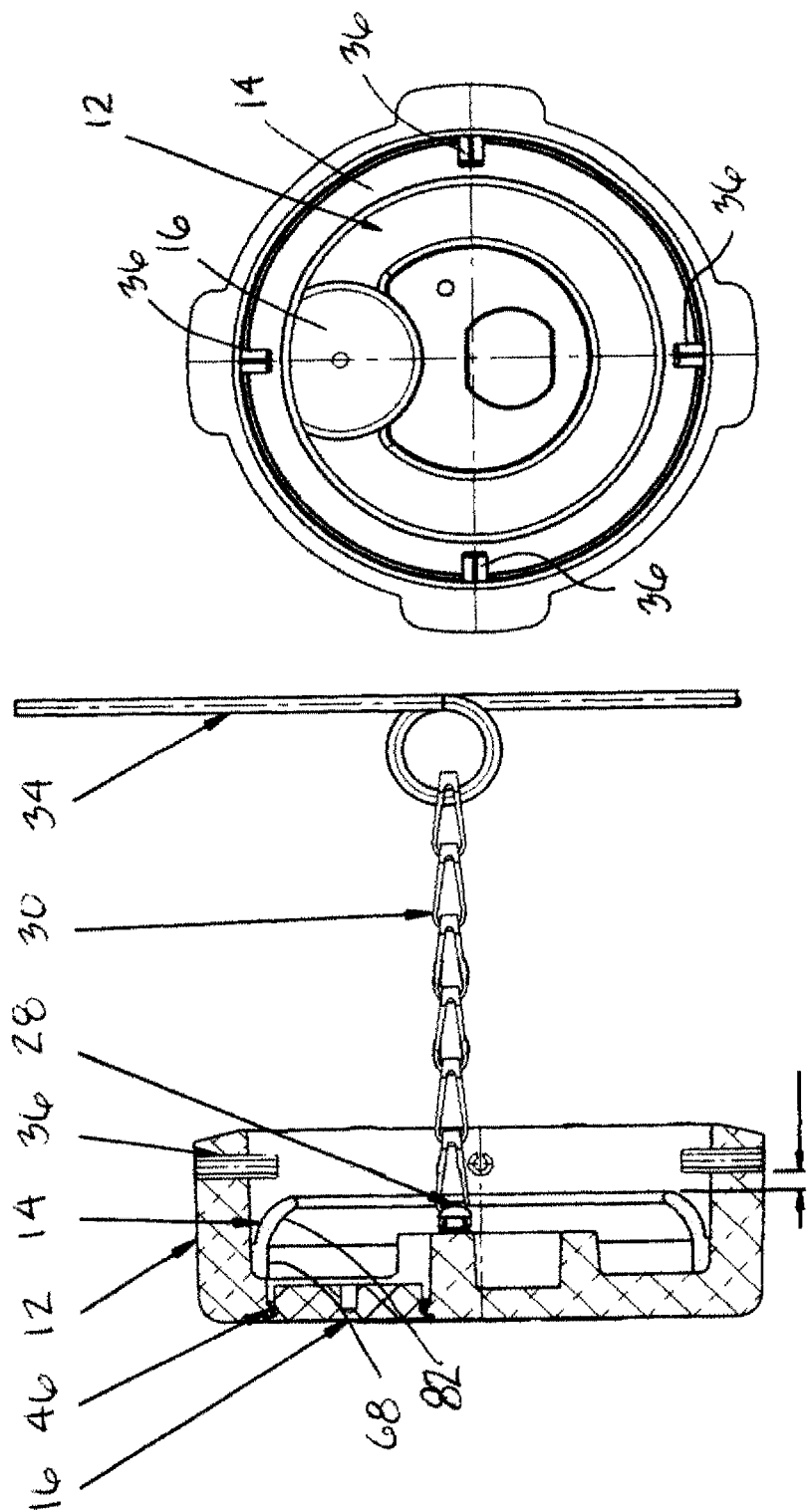

FUEL CAP AND SEAL ASSEMBLY

TECHNICAL FIELD

The present invention relates to a fuel cap and seal assembly, and a process of manufacturing the same, for use in commercial vehicles, and more particularly, to a fuel cap and seal assembly that includes an improved seal that eliminates many components of prior art fuel cap assemblies.

BACKGROUND OF THE INVENTION

Fuel tank caps, also called filler cap assemblies, may be used for sealing the opening of a fuel tank of a vehicle, such as a commercial trucking vehicle. Fuel caps typically are placed on the fuel tank opening and are locked in place to create an airtight seal over the opening. It may be desirable that the airtight seal be maintained during operation of the vehicle so that fuel or fuel vapor is not lost to the atmosphere and so that spillage of the fuel does not occur. Accordingly, it may be desirable that the seal and the locking mechanism be sturdy enough to withstand the harsh environmental conditions of commercial vehicle usage such as extreme weather conditions and continued vibration of the fuel tank and cap during operation of the vehicle. Moreover, it may be desirable that fuel caps maintain an airtight seal over the fuel tank opening during a sudden impact to the fuel tank, such as during a collision, so that fuel is not discharged, which may result in a fire or an explosion.

SUMMARY OF THE INVENTION

The present invention provides a fuel cap including a body and a seal positioned within the body and adapted for engaging a filler tube opening, the seal itself acting as a spring that biases the cap along an elongate axis of the body, to seal the cap on a fuel tank.

BRIEF DESCRIPTION OF THE DRAWINGS

FIG. 5 is a cross-sectional side view of the assembly of FIG. 1.

FIG. 6 is a bottom view of the fuel cap and seal of FIG. 1.

DETAILED DESCRIPTION OF THE DRAWINGS

Figure 1:
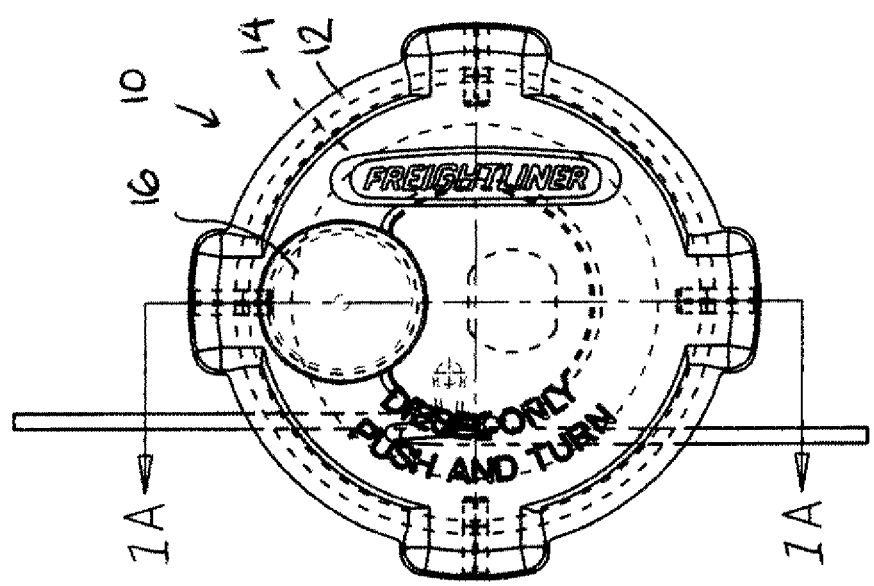
FIG. 1 is a plan view of one example embodiment of a fuel cap and seal assembly.

FIG. 1 is a plan view of one example embodiment of a fuel cap and seal assembly 10 including a fuel cap 12 and a seal 14 positioned and secured within said cap 12. Cap 12 may have a pressure relief valve 16 that may open at a predetermined temperature within a fuel tank 40 (FIG. 2) on which cap 12 is secured. Cap 12 may be secured on a filler tube neck 32 of fuel tank 40 (see FIG. 2) which may be positioned on a commercial vehicle such as on a tractor of an eighteen wheel trailer.

Figure 2:
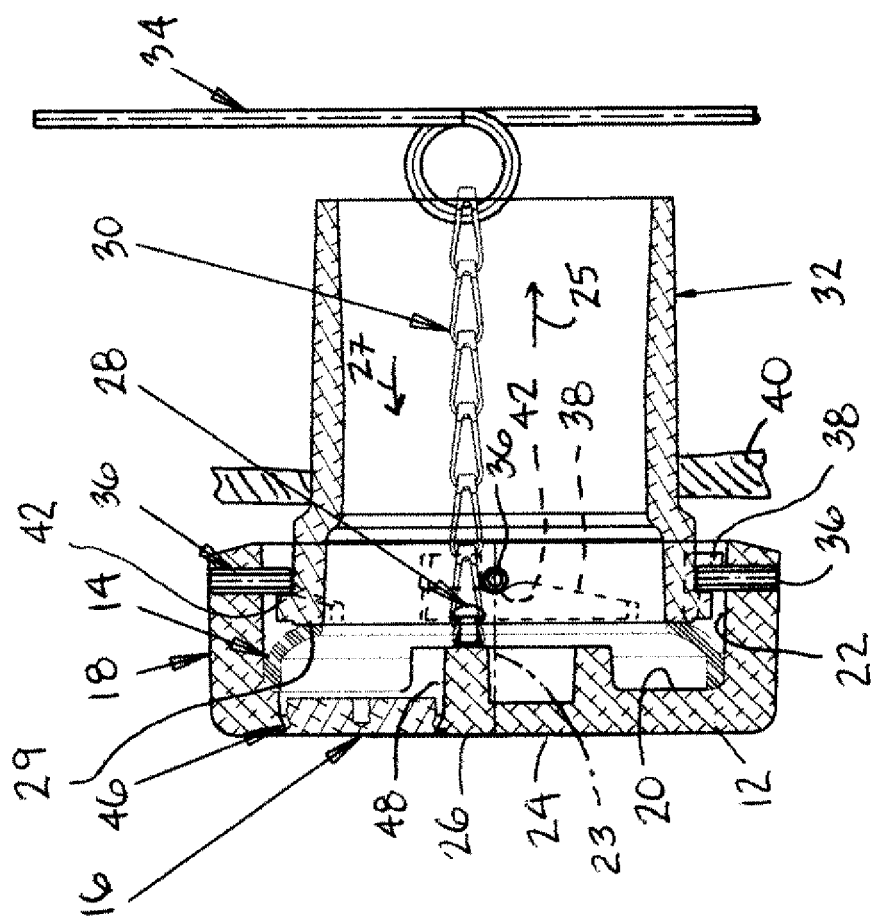
FIG. 2 is a cross-sectional side view of the fuel cap and seal assembly of FIG. 1 mounted on a fuel filler neck and taken along lines 1A-1A of FIG. 1.

FIG. 2 is a cross-sectional side view of the fuel cap 12 and seal assembly 10 of FIG. 1 mounted on a fuel filler neck 32 of tank 40. In this embodiment cap 12 includes a cap body 18 that includes a recessed or bottom surface 20 and a side surface 22 that together frictionally secure seal 14 thereon. Pressure relief valve 16 is shown extending from bottom surface 20 to an exterior surface 24. Bottom surface 20 includes a securement port 26 for receiving a fastener 28, such as a bolt, to secure a sash chain 30 and a bail 34 which functions to retain cap on the fuel filler neck 32 of a fuel tank 40. In one embodiment, cap 12 may be generally circular in shape and side wall 22 may be generally cylindrical in shape and may define an elongate axis 23 of cap 12 and of fuel filler neck 32 when cap 12 is secured there to.

Cap 12 further includes a plurality of pins 36 positioned around a perimeter of side surface 22. In the embodiment shown cap 12 includes four pins 36 positioned every ninety degrees around side surface 22. Due to the resiliency and biasing force of seal 14 positioned between cap 12 and top surface 29 of fuel filler neck 32, pins 36 each move downwardly in a direction 25 and radially along a corresponding cam ramp 38 on an underside of fuel filler neck 32. The pins 36 then each move slightly upwardly in a direction 27 into a pin receiving recess 42 at an end of cam ramp 38 of the fuel filler neck 32 so as to secure cap 12 on fuel filler neck 32. The biasing force of seal 12 retains pins 36 in each of their corresponding pin receiving recess 42. As cap 12 is turned on fuel filler neck 32, pins 36 move downwardly along cam ramps 38 which pulls cap 12 downwardly onto fuel filler neck 32, thereby compressing seal 14. Seal 14 is made of a resilient and flexible material having a sufficient memory so that the seal is compressed by the action of cap 12 being pulled downwardly onto fuel filler neck 32. This action of compressing flexible seal 14 causes seal 14 to sealingly engage the top surface 29 of fuel filler neck 32 while seal 14 simultaneously biases cap 12 away from top surface 29 of fuel filler neck 32, thereby retaining pins 36 in recesses 42 such that cap 12 is retained on fuel filler neck 32.

Accordingly, the present invention, including improved seal 14, provides a fuel cap assembly 10 that is elegant in its simplicity in that seal 14 itself biases cap 12 away from fuel filler neck 32 so as to retain pins 36 in recesses 42 while simultaneously sealingly engaging the top surface 29 of fuel filler neck 32 to provide an air tight and fluid tight seal there against. This sealing and biasing action of seal 14 is accomplished without the use of additional structure or structures such as a coil spring, a seal seating structure or a plunger mechanism positioned within cap 12. The improved process of manufacturing assembly 10 includes manufacturing cap 12, manufacturing seal 14, and then frictionally retaining seal 14 within cap 12 by placing seal 14 against bottom surface 20 and side surface 22 of cap 12. This simple manufacturing process eliminates multiple expensive components of the prior art apparatus and also eliminates multiple manufacturing and assembly steps of the prior art assembly process. Accordingly, the fuel cap assembly 10 of the present invention is more cost effective to manufacture and less time consuming to assemble than prior art cap assemblies. Moreover, the assembly 10 of the present invention is more durable in use because there are fewer working parts which may malfunction and if seal 14 does malfunction it is easily replaced in cap 12 by simply manually lifting seal 14 out and replacing the seal with a new seal 14.

In tests conducted on the assembly 10 including improved seal 14, seal 14 maintained its air tight and fluid tight seal on fuel filler neck 32 during the course of over 7,000 cycles of cap tightening and loosening. The assembly 10 was pressure tested by pumping hydraulic pressure up to an amount until a failure occurred. The assembly of the present invention failed at a pressure rated high enough to pass current commercial trucking fuel cap specifications. The assembly 10 was drop tested by dropping a fuel tank 40 with the assembly 10 installed thereon, from a 31 foot height. The assembly 10 maintained its air tight and fuel tight seal on tank 40 during such testing. Assembly 10 was also tested by exposing tank 40 with assembly 10 secured thereon to diesel fuel at ambient and elevated temperatures. The seal 14 did not decompose or otherwise experience detrimental effects during such testing. The materials utilized for manufacture of improved seal 14 are believed able to withstand cold temperatures down to −40 degrees Fahrenheit such that seal 14 will provide sufficient sealing against fuel filler neck 32 and sufficient biasing of cap 12 away from fuel filler neck 32 at such low temperatures. The materials utilized for manufacture of improved seal 14 are also believed to remain flexible and pliable at such a low temperature such that cap 12 may be turned on fuel filler neck 32 and cap 12 and seal 14 together removed from fuel filler neck 32 at −40 degrees Fahrenheit.

The materials utilized to manufacture improved seal 14 include thermoplastic materials such as VMQ/Si (silicone) and NBR (Nitrile, also known as Buna-N). One particular embodiment may include a 38% to 39% CAN, 80 shore mixture of Buna N thermoplastic material. Other materials may be utilized to manufacture seal 14 with properties desirable for sealing cap 12 on a fuel filler neck 32.

Body 18 of cap 12 and fuel filler neck 32 may be manufactured of die cast aluminum but other manufacturing methods and materials may also be used. In particular, any suitable manufacturing processes and any suitable materials may be utilized to manufacture the cap and filler tube components of the present invention.

A fuse melt ring 46 and thermal relief plug 16 may each be manufactured of a material that melts upon reaching a predetermined temperature. In one embodiment, fuse melt ring 46 may be manufactured of a lead alloy and thermal relief plug 16 may be manufactured of aluminum, wherein one or both materials may have a melting point of approximately 220° F. Accordingly, if the temperature inside fuel tank 40 reaches or exceeds the temperature of the melting point of the lead alloy, the lead alloy adhesive will melt. This will allow the pressure within fuel tank 40 to expel the aluminum plug 16 thereby dissipating the pressure within the fuel tank through an opening 48 in which thermal release plug 16 is secured. Accordingly, release plug 16 may allow the dissipation of pressure within the fuel tank during a fire in the fuel tank so as to reduce the possibility of an explosion of the tank. Those skilled in the art will understand that any type of relief valve, or an absence of a relief valve, may be used as is desired.

Figure 4:
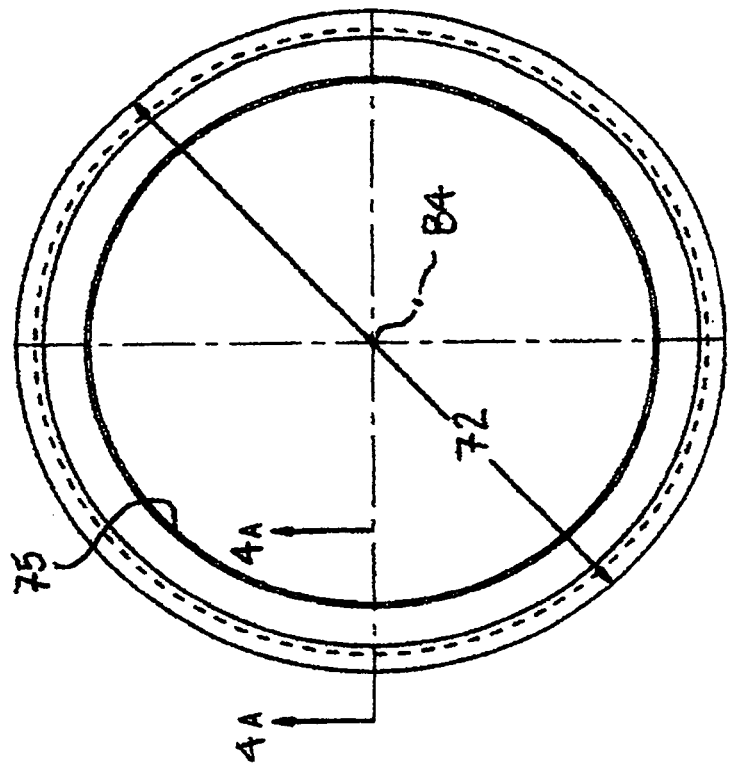
FIG. 4 is a plan view of the seal of FIG. 1.
Figure 3:
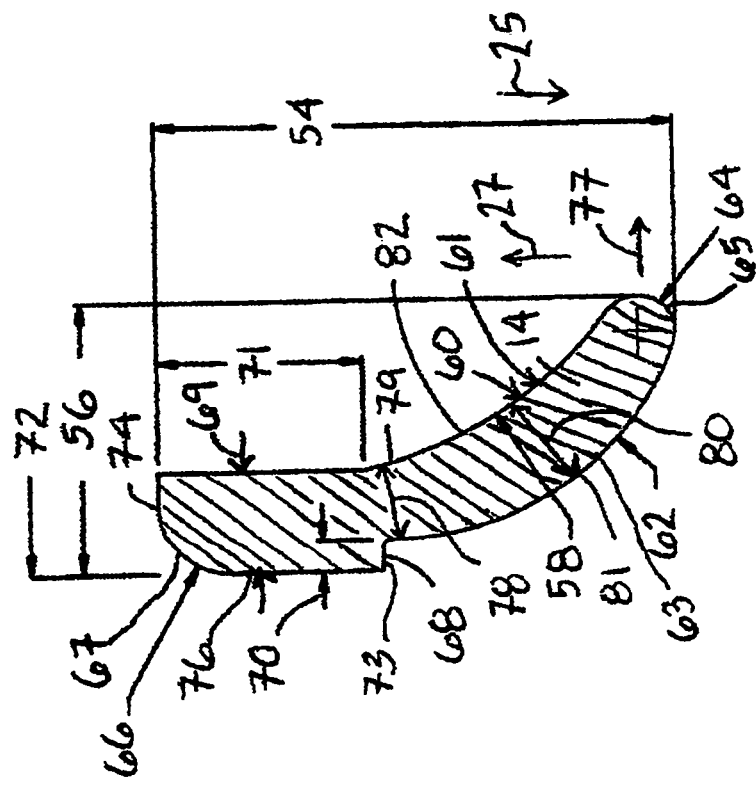
FIG. 3 is a cross-sectional side view of the seal of FIG. 1 taken along line 4A-4A of FIG. 4.

FIG. 3 is a cross-sectional side view of the seal 14 of FIG. 1 taken along line 4A-4A of FIG. 4. In the particular embodiment shown, seal 14 defines a height 54 of 0.642 inches, a width 56 of 0.357 inches, a central region 58 having an inner surface 60 with a radius of curvature 61 of 0.5 inches, and an outer surface 62 with a radius of curvature 63 of 0.38 inches. Seal 14 includes a first end region 64 having a radius of curvature 65 of 0.047 inches and a second end region 66 having a radius of curvature 67 of 0.09 inches. Seal 14 includes a base region 68 having an additional thickness 70 of 0.04 inches in addition to the thickness of central region 58 of seal 14, and a height 71 of 0.254 inches. This additional thickness of base region 68 results in base region 68 including a shoulder 73 that spaces central region 58 from side surface 22 of cap 12 (FIG. 1), which facilitates movement of central region 58 with respect to base region 68 during tightening of cap 12 on a fuel filler neck 32 (FIG. 2).

FIG. 4 is a plan view of the seal of FIG. 1. In this particular embodiment, seal 14 may define a diameter 72 of 3.5 inches. Referring to FIGS. 3 and 4, a bottom surface 74 of seal 14 will contact bottom surface 20 of cap 12 (FIG. 1) and a side surface 76 of base region 68 will contact side surface 22 of cap 12. Contact of seal 14 with the surfaces 20 and 22 of cap 14 will frictionally retain seal 14 on cap 12, even when the cap 12 is removed from contact with a fuel filler neck 32 (FIG. 2).

Referring now to FIGS. 2, 3 and 4, as cap 12 is turned on fuel filler neck 32, and pins 36 pull cap 12 downwardly onto fuel filler neck 32 in direction 25, first end region 64 of seal 14 will contact top surface 29 of fuel filler neck 32 thereby biasing seal first end region 64 to move along surface 29 in an inwardly radial direction 74. This inwardly radially sliding and bending movement of seal 14 may be accomplished due to the curved shaped of central region 58 of seal 14 having a radially curved inner surface 60 and a radially curved outer surface 62. The curving and bending movement of central region 58 is also facilitated due to the thickness and shape of base region 68 which tends to remain stationarily seated against and frictionally secured to bottom surface 20 and side surface 22 of cap 12. In other words, thicker base region 68, having a thickness 69, of seal 14 remains generally stationary on cap 12 whereas curved, bendable central region 58 and first end region 64 of seal 14 slide inwardly in direction 77 and move upwardly in direction 27 as the cap 12 is pulled downwardly onto fuel filler neck 32. Moreover, the radius of curvature of inner surface 60 of central region 58 is greater than the radius of curvature outer surface 62 of central region 58 such that the thickness 78 of seal 14 at a position 79 adjacent to base 68 is less than a thickness 80 of seal 14 at a position 81 in a middle portion of central region 58. The radius of curvature of surface 60 being greater than the radius of curvature of surface 62 means that a center of a radial circle of surface 60 is positioned a distance further from surface 60 than is a center of a radial circle of surface 62 from surface 62. The thicknesses 69, 78 and 80 may each be measured in a radial direction, i.e., along a radius from a center 84 (FIG. 4) of aperture 75 of seal 14. The thinner portion of seal 14 at position 79, compared to the slightly thicker portion of seal 14 at position 81 facilitates central region 58 and first end region 64, together referred to as an arm 82 of seal 14, bending and moving with respect to base region 68 at position 79 just outside base region 68. The resiliency and biasing properties of seal 14 allow the seal itself to push cap 12 upwardly in direction 27 so as to retain pins 36 within recesses 42 of cam ramps 38 (FIG. 2) so as to retain cap 12 securely on fuel filler neck 32.

FIG. 5 is a cross-sectional side view of the assembly 10 of FIG. 1.

FIG. 6 is a bottom view of the fuel cap and seal of FIG. 1.

In the above description numerous details have been set forth in order to provide a more through understanding of the present invention. It will be obvious, however, to one skilled in the art that the present invention may be practiced using other equivalent designs.

I claim:

1. A fuel tank cap comprising:
   a metal body having an interior bottom surface and an interior side surface; and a distinct, flexible seal manufactured separate from said body and being positioned within said body and adapted to sealingly engage a filler tube opening, said seal including a base and an arm, said base frictionally positioned against said interior bottom surface and said interior side surface of said body, said arm extending outwardly from said base and positioned out of contact with said interior bottom surface and said interior side surface of said body, wherein said arm defines a first thickness directly adjacent said base and a second thickness in a central region of said arm, and wherein said first thickness is less than said second thickness.

2. A cap according to claim 1 wherein said arm includes an inner surface that defines a continuous inner curved surface having a first radius of curvature and an outer surface that defines a continuous outer curved surface having a second radius of curvature, said first radius of curvature being greater than said second radius of curvature.

3. A cap according to claim 1 wherein said seal arm defines an arcuate cross sectional shape.

4. A cap according to claim 1 wherein said seal arm is biased radially inwardly when said cap is secured on a fuel filler neck.

5. A cap according to claim 1 wherein said seal is manufactured of a thermoplastic material having resilient and biasing properties.

6. A cap according to claim 5 wherein said seal is manufactured of a material chosen from the group consisting of silicone and nitrile.

7. A cap according to claim 1 wherein said seal base defines a thickness greater than a thickness of said seal arm.

8. A cap according to claim 1 wherein said seal base includes a shoulder that spaces said seal arm completely out of contact with said interior side surface of said base.

9. A cap according to claim 1 wherein said seal is positioned in direct physical contact with said cap at said interior bottom and side surfaces.

10. A cap according to claim 1 wherein said body is the only seal supporting structure in said cap.

11. A fuel cap comprising:
a rigid body having an interior surface; and
a distinct seal positioned within said body and adapted to sealingly engage a filler tube opening, said seal including a base and an arm, said base frictionally positioned against said interior surface of said body, said arm including an inner, continuously curved surface having a first radius of curvature and an outer, continuously curved surface having a second radius of curvature, said first radius of curvature being greater than said second radius of curvature, and said arm being out of contact with said rigid body at all times.

12. A cap according to claim 11 wherein said arm extends outwardly from said base, wherein said arm defines a first thickness directly adjacent said base and a second thickness in a central region of said arm, wherein said first thickness is less than said second thickness.

13. A cap according to claim 12 wherein said seal defines a circular shape having a central aperture extending there through, and wherein said first and second thicknesses are each measured along a radial direction from a center of said seal.

14. A cap according to claim 12 wherein said base defines a third thickness, said third thickness greater than said first and second thicknesses.

15. A cap according to claim 11 wherein said arm extends outwardly from said base and includes an end region positioned distal from said base, said end region including a curved exterior surface of said seal having a radius of curvature smaller than said first radius of curvature and said second radius of curvature.

16. A cap according to claim 11 wherein said seal is circular in shape having a central aperture extending there through, wherein said first radius of curvature defines said central aperture, and wherein said second radius of curvature defines an outer surface of said seal.

17. A fuel cap comprising:
a rigid body having an interior surface; and
a seal manufactured distinct from said body and including a base and an arm, said base frictionally positioned against said interior surface of said body and defining a central aperture of said seal having an elongate axis extending there through, said arm positioned completely out of contact of said body and including a single fuel neck contacting surface positioned perpendicular to said elongate axis.

18. A cap according to claim 17 wherein an inner surface of said arm in an unbiased position defines a continuously curved surface extending inwardly toward said elongate aperture and defining a first radius of curvature.

19. A cap according to claim 18 wherein said inner surface of said arm in a biased position defines a continuously curved surface extending inwardly toward said elongate aperture and defining a second radius of curvature smaller than said first radius of curvature.

20. A cap according to claim 17 wherein said seal produces a biasing force on said cap by said arm in a direction parallel to said elongate axis.

* * * * *